United States Patent [19]

Buchner et al.

[11] Patent Number: 5,293,467
[45] Date of Patent: Mar. 8, 1994

[54] METHOD FOR RESOLVING PRIORITY BETWEEN A CALLIGRAPHICALLY-DISPLAYED POINT FEATURE AND BOTH RASTER-DISPLAYED FACES AND OTHER CALLIGRAPHICALLY-DISPLAYED POINT FEATURES IN A CIG SYSTEM

[76] Inventors: Gregory C. Buchner, 2240 Brian Ave., South Daytona, Fla. 32119; Jeffrey D. Potter, 814 Banbury Dr., Port Orange, Fla. 32119; Walter R. Steiner, 1-C Timberline Trail, Ormond Beach, Fla. 32174

[21] Appl. No.: 679,806

[22] Filed: Apr. 3, 1991

[51] Int. Cl.$^5$ .............................................. G06F 15/62
[52] U.S. Cl. .................................. 395/122; 395/119; 395/133; 395/135
[58] Field of Search ............................ 395/119–123, 395/125–127, 133–135, 131

[56] References Cited

U.S. PATENT DOCUMENTS

| | | | |
|---|---|---|---|
| 3,889,107 | 6/1975 | Sutherland | 395/123 X |
| 4,625,289 | 11/1986 | Rockwood | 395/122 |
| 4,825,391 | 4/1989 | Merz | 395/131 |
| 4,952,922 | 8/1990 | Griffin et al. | 395/124 X |
| 4,970,499 | 11/1990 | Ryherd | 340/729 |
| 4,970,500 | 11/1990 | Hintze | 340/703 |

*Primary Examiner*—Gary V. Harkcom
*Assistant Examiner*—Almis Jankus

[57] ABSTRACT

A method for determining the proper occulation relationship between a calligraphic point and at least one of another calligraphic point and a surface in a raster image, divides the total image screen into an array of spans, each containing an ordered set of pixels which may be further divided into an array of subpixels; determines which of the subpixels on the total screen lie inside each of the raster surfaces and calligraphic points which must be considered for the image totality; then orders the distance of each of the raster surfaces from the viewing point and also orders the distance of each of the point features from the viewing point; and then compares the ordered distances of each point to at least one of the raster surface distances and other point distances to determine which of subpixels of the point or surface/other point are occluded and which subpixels are visible.

17 Claims, 2 Drawing Sheets

METHOD FOR RESOLVING PRIORITY BETWEEN A CALLIGRAPHICALLY-DISPLAYED POINT FEATURE AND BOTH RASTER-DISPLAYED FACES AND OTHER CALLIGRAPHICALLY-DISPLAYED POINT FEATURES IN A CIG SYSTEM

FIELD OF THE INVENTION

This invention relates to computer image generation (CIG) systems and, more particularly, to a novel method for resolving depth priority between calligraphically-displayed point features and at least one of raster-displayed features and other calligraphic-displayed point features in a CIG system.

BACKGROUND OF THE INVENTION

It is now well known to design real-time computer image generation (CIG) systems to provide realistic reproduction of images for a variety of simulator systems, such as flight simulators and the like. In such systems, image generation can be broken down into three separate processing stages: controller, geometry processor and display processor. Each of these three processing stages works, independently of the other, on data corresponding to one of three consecutive images to be displayed. The controller processes data in an image or scene for a fixed time and then passes its processed data to the geometry processor. The geometry processor has an equal amount of time to do its calculations and at the end of that time sends its results to the display processor. The display processor processes the data for final display on a video display. For each time interval, all three processors are kept busy, so that at any given time, the processors are working on three separate scenes. Data flows through the three stages in a sequential manner, so that to maximize processor efficiency, an image or scene is divided into a plurality of spans which are sequentially processed. Each span is, conceptually, a small (generally rectangular) area on the display screen, and is comprised of a matrix of picture elements (pixels). An object-to-be-displayed is comprised of at least one individual face, where each face is bounded by straight lines and is thus an uninterrupted, continuous area. A face, therefore, may cover a number of spans, and a span may contain a number of faces. The overall goal of an area (span) processing system is to maximize the efficiency of the three separate processors, and provide a realistic correct image while satisfying real-time processing constraints. It is now well known to reduce the total calculations and calculation time in situations where a plurality of objects were positioned in front of, or behind, each other, by utilizing a depth buffer to determine for each of a plurality of faces, forming the totality of object portions in each span, which face portion is in front of, and therefore is visible over, other face portions further from the observer. One depth-buffer-priority processing scheme is described and claimed in U.S. Pat. No. 4,825,391, issued Apr. 25, 1989 to the assignee of the present application, and incorporated herein in its entirety by reference. This reference is concerned with formation of a raster image, as on a normal CRT display, where the raster traces through the array of spans of an image.

It is also well known that an image can be formed upon a calligraphic-raster display device which not only allows the normal raster image to be displayed in a desired scanned fashion (e.g. left-to-right in each row, with a plurality of rows being sequentially written from top to bottom of the screen), and also allows calligraphic point features to be individually placed upon the screen. Typically, the raster image can be overwritten by each calligraphic point feature, as the writing electron beam is deflected in vector fashion so as to draw lines and points over the raster image. This overwriting procedure produces clear sharp points and lines free from distracting effects caused by rasterizing the image, for example, scintillations, stairstepping and the like phenomena are reduced, if not completely removed. However, proper display of a total scene requires that the occultation of different object polygons of the raster image not only be determined, as by the depth (Z) buffer method of the aforementioned Patent, but also requires determination of the proper occultation relationships between the raster and the calligraphically-displayed point features (which are not necessarily single "points", but may have a real, non-zero radius), and in fact, between different ones of the calligraphically-displayed point features themselves. For example, if a calligraphic point feature is visually located behind the surface of the polygon in the raster image, that calligraphic point feature should not be displayed; of course, since the point feature has not only a center location but also a radial extent (i.e. is not a single "point"), the point feature can partly occult, or be partly occulted by, a polygon surface in the raster image and only a part of the circular point feature would then be visible and be displayed in the resulting total image. Similarly, because the calligraphic features can have different radial extent, even if different point features have centers lying at the same point, proper occulation between different calligraphic point features must also be obtained. Accordingly, it is therefore highly desirable to provide a single method for resolving priority between calligraphic-displayed point features and both other calligraphic-displayed point features and raster-displayed features; it is highly desirable that this process utilize the depth-buffer-based method previously used for resolving priority between plural raster display features.

BRIEF SUMMARY OF THE INVENTION

In accordance with the present invention, a method for determing the proper occultation relationship between a calligraphic point and at least one of another calligraphic point and a surface in a raster image, utilizes the steps of dividing the total image screen into an array of spans, each containing an ordered set of pixels which may be further divided into an array of subpixels; determining which of the cells (i.e. the pixels) subpixels on the total screen lie inside each of the raster surfaces and calligraphic points which must be considered for the image totality; ordering the distance of each of the raster surfaces from the viewing point; ordering the distance of each of the point features from the viewing point; and comparing the ordered distances of each point feature to at least one of the raster surface distances and other point feature distances to determine which of the subpixels of the point feature or the surface/other point feature are occluded and which subpixels are visible.

In a presently preferred embodiment, a pixel-fill circuit is modified to determine subpixel priority for each of a sequence of range-sequential raster cells and to store range information therefore, and to separately determine priority for each of a sequence of point-feature cells following in the same range-separated group, to resolve raster-to-raster and point feature-to-point feature cell (subpixel) priorities; raster-point feature cell (subpixel) priorities are then resolved with a depth (Z) buffering procedure.

Accordingly, it is an object of the present invention to provide a novel method for resolving priority between at least one calligraphically-displayed point feature and at least one other display feature, which may be a raster-displayed feature and/or another calligraphically-displayed point feature.

This and other objects of the present invention will become apparent upon a reading of the following detailed description of the presently preferred embodiment, when considered in conjunction with the associated drawings.

DETAILED DESCRIPTION OF A PRESENTLY PREFERRED EMBODIMENT

Figure 1:
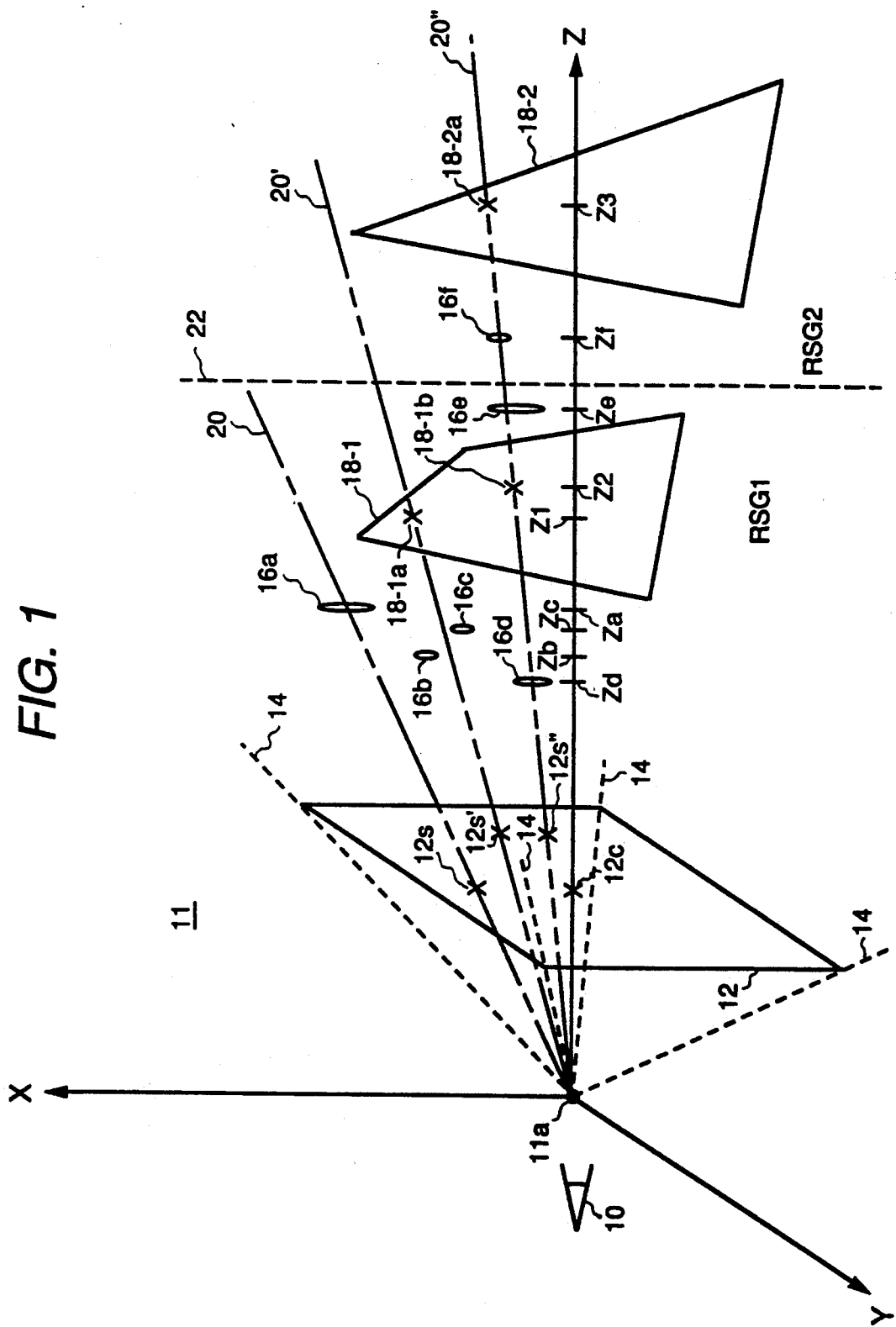
FIG. 1 is a schematic side view of a portion of the viewer space of a computer image generation system, and of raster-displayable face surfaces and calligraphically-displayable point features therein.

Referring initially to FIG. 1, it is desired to display the view seen by a viewer 10 looking into viewer space 11, along the Z axis thereof, so that a viewing plane 12 extends in the X-Y direction and substantially perpendicular to the depth (Z) axis of viewer space 11, with the axis passing from the viewing point 11a through the image plane center 12c. The field-of-view (FOV) of viewer 10 defines the extent of image plane 12, as shown by FOV lines 14; the FOV also limits the amount of viewer space 11 in which various point features 16a, 16b, . . . and various surface faces 18-1, 18-2, . . . are potentially viewable. Each of point features 16 is actually of spherical shape, but becomes of substantially circular shape when projected into viewer space; the plane of the circular point feature is substantially perpendicular to depth axis Z, and the circular point feature has a center and a non-zero radius. Thus, as shown in FIG. 1, wherein the reader is viewing space 11 from a location substantially perpendicular to axis Z, each of the circular point feature surfaces appears as a somewhat oval, planar shape, with a disk of extent determined by its radial size. Each of faces 18 can be of any desired geometric shape and can have its substantially flat surface disposed at any angle with respect to depth axis Z.

A first sightline 20 extends from the viewing space origin 11a through a first selected location 12s (here, a subpixel location) in the viewing plane and thence through a point feature 16a, and does not pass through any other displayable feature; there is no problem with determining the feature attributes of (subpixel) cell 12s—they are the attributes of the only encountered feature (point 16a, at a distance Za) along line 20. The total viewable scene is obtained as each cell of the image plane 12 is sequentially considered. Eventually, another cell (here, of a subpixel 12s') is reached for which the features along an associated sightline 20' are considered; this line misses point features 16b/16c and passes only through a point 18-1a of one face 18-1 at a distance Z1, so that the attributes viewable in cell 12s' are also easily found. Another sightline 20'' passes through a (subpixel) cell 12s'' and then passes successively through a point feature 16d, a point 18-1b upon the first surface 18-1, other point features 16e and 16f, and a point 18-2a upon the second surface 18-2. Those skilled in the art will understand, by reference to the aforementioned patent, that, in the absence of point features 16d–16f, priority between surface face points 18-1b and 18-2a would be determined by a depth buffering operation, establishing the depth Z distances of each point along the Z axis, e.g. distance Z2 for point 18-1b and distance Z3 for point 18-2a from viewing space origin point 11a, and by then determining which of the Z distances is the lesser (e.g. Z2<Z3); separation (along the vertical broken range-separation line 22) of the faces into distinct range separable groups (RSGs), such as RSG1 containing face 18-1 and RSG2 containing face 18-2, may be utilized to aid in the depth Z buffer determination process. The present method determines the visibility priority of each cellular contribution of a point feature (e.g. point feature 16d) with respect to the contribution, in the same cell, of other point features (e.g. point features 16e and 16f) along the same sightline (e.g. sightline 20'') as well as with respect to raster surface face points (e.g. points 18-1b and 18-2a) also encountered along that same sightline.

When more than one feature (point features and/or surface features) lie upon the same cell (e.g. subpixel 12s'') of the image plane, an occultation operation must be performed to determine which feature is closest to the viewer at that cell (subpixel) location, and therefore to be displayed as the single visible feature within that cell. The Z distance from the viewer to the feature (either the surface point or the circular point feature) is calculated for each feature and that Z distance, along the Z axis, is compared to the Z distance for all other features along the same sightline. If the distance, in each particular cell, from the viewer to the circular point feature is smaller than the distance from the viewer to any other point feature or raster feature, that circular point feature is visible in that cell and the distance of that visible feature is assigned to the subpixel cell. Similarly, if the distance to another point feature or to a surface point is smaller, the distance to that other point feature or surface point is assigned to the particular subpixel. This process is extendable to any number of surface faces and/or circular point features lying on a particular cell. Thus, distance from the viewer to each feature at a subpixel cell location is calculated, compared and the smallest distance is assigned to the subpixel cell. Because the display is first provided with raster information and is then provided with calligraphic light information, one aspect of the present invention is to separately operate upon all raster surfaces and separately operate upon all calligraphic lights (which are advantageously formed upon the display in a time interval different from the time interval in which the raster display is formed) so that voids in the raster display are not caused by the calculated presence of calligraphic points.

We therefore initially separate all of the calligraphically-displayable point features into a first group C and separate all of the raster-displayable surface faces into a raster group R. The surface information of the faces in group R is processed first, utilizing range-separable groups and a depth comparison operation; when all of the surfaces in group R are processed and the depth-buffered cell information stored, each image plane subpixel contains a Z distance which represents the distance from the viewer to the closest surface at that subpixel location. The point features of group C are now processed. If the faces have been separated into RSGs, then the point features are also separated into range-separable groups, and are organized at the end of (i.e., after the faces) of the associated RSG. Thus, as shown in FIG. 1, the first range-separable group (RSG1) contains not only face 18-1 but also calligraphic point features 16a–16e, which are ordered at the end of RSG1; the further range-separated group RSG2 contains a single point feature 16f, which is ordered after the face 18-2. The point features are now ordered from front (i.e. closest to viewing point 11a) to back (i.e. furthest from viewing point 11a); this ordering may be absolute, among all of the point features (if RSGs are not utilized) or may be a front-to-back ordering of all point features within the particular RSG. Because each point feature is defined to always lie in a plane parallel to the image plane (and therefore perpendicular to the Z axis) the ordering operation is done by simply ordering the Z-axis distance to each point feature. Thus, in RSG1, point features 16a–16e would be ordered with the associated Z distances (e.g. Zd, Zb, Zc, Ze). Thus, by ordering the calligraphic point features from front-to-back, the calligraphic point features are in priority order, so that, at this stage of the operation, a list of priority-ordered calligraphic lights is known from group C along with the Z distance to each point feature, and a Z distance for each subpixel from group R is also known.

Each of the calligraphic point features is now assigned to the at least one cell which that point feature covers; a method such as that described and claimed in co-pending U.S. application Ser. No. 07/669,017 and the like can be utilized to determine which subpixels lie on each calligraphic point feature (by reference to the center and radius of that particular point feature). Processing of the C group thus commences with each subpixel (cell) allocation in an accumulated group record being reset to zero, and each of the subpixels of the first circular point feature (e.g. feature 16d at closest distance Zd) now being considered as a closest point subpixel; if that subpixel has a visible attribute, it is added to the accumulated group C subpixel record of visible subpixels which have been encountered. The accumulated group C subpixel record is then compared with the subpixels found to lie upon the second-encountered circular point feature (say, point feature 16e, in back of face 18-1) and any subpixel locations of the second point feature which are already included (set) in the accumulated record are eliminated from consideration, as being occulted. The remaining second-considered point feature subpixels are added to the accumulated record, which now contains all of the subpixels which are occupied by visible portions of the first two calligraphic points. The subpixels of a third point feature (say, point feature 16f) are then individually compared against the accumulated record and any common subpixels are removed from the third point feature. The remaining subpixels of the third point feature are therefore not occluded and, being visible, are added to the accumulated record. This process continues until each cell of each of the calligraphic point features in the list is compared against the record of which cells in the image plane are already occupied by a portion of any of the closer calligraphic features and the occulted point feature cells (subpixels) are eliminated. If no subpixels of a point feature are visible, the point feature is entirely discarded and is not placed upon the list. Therefore, an ordered list of all calligraphic point feature subpixels is known, along with the Z distance from the viewer to the point feature and a list of all of the visible subpixels for each point feature is recorded; this completes the calligraphic point-calligraphic point comparison process.

The display image is formed by first raster scanning the group R pixel data. If nothing further is done, then a normal raster display results; there are no "holes", because the calligraphic point features have not been subtracted from the raster scan data. A calligraphic display interval follows the end of each raster display interval; the calligraphic data is completed while the raster data display is ending. For each sequential subpixel in each pixel sequentially scanned by the raster, the Z distance of each calligraphic point feature in the C group lists is compared with the Z distance for the same subpixel in the R group list. For example, for subpixel 12s'', the C list shows a closest distance Zd for the point feature 16d (note that the same subpixel 12s'' portions of point features 16e and 16f have been discarded, as features 16e and 16f have greater Z axis distances), and the group R list shows the distance Z2 to the closest face point 18-1b (which was determined to be closer than the distance Z3 of the next-encountered face point 18-2a). If the calligraphic point feature Z distance (here, distance Zd) is closer (as here) than the raster point Z distance (here, distance Z2), Then the subpixel of the newer calligraphic point feature is retained. Conversely, if the raster subpixel is closer, as determined by the depth Z buffer operation, the calligraphic point feature subpixel information is not used. This process eliminates all calligraphic point subpixels which are occulted by surfaces in group R. Thus, final lists are available of: all visible raster subpixels (and, by suitable averaging or other processing, all visible pixels); all visible calligraphic point feature subpixels and pixels; and a merged list which contains all of the totality of raster-viewable and calligraphically-viewable points making up the final display image. The data of each list may be displayed separately (as for system test purposes), although only the merged list contains the full desired set of display data. The visible attributes of each calligraphic point feature can now be modified, in accordance with the percentage thereof actually appearing in the final display. That is, once the list of calligraphic point feature visible subpixels is available, after raster-calligraphic point feature comparison in the depth buffer, the number of visible subpixels of each point feature can be counted and this count used to approximate the calligraphic point feature size (i.e. the remaining point feature area). For example, suppose a point feature had an original radius of five subpixels, so that this point feature lies on a total of $\pi(r=5)^2=78$ subpixels, but, after the occulting operations are completed, a lesser number (say only 16 subpixels) remain to determine the display attributes of this particular point feature. One of several methods can be utilized to determine the feature characteristics; two possible examples are: (1) the size (i.e. number of subpixels) can be reduced to dim the brightness of the point, as by finding a new point feature radius to be the square root of the quotion of remaining pixels and $\pi$, i.e. for 16 remaining subpixels a new radius of $(16/\pi)^{\frac{1}{2}}=2.26$ subpixels, so that the point feature visible size is reduced, or (2) instead of reducing the size to produce the effect of the point feature being properly occulted, both the size and brightness of the remaining pixels may be reduced. The original number of point feature subpixels may be compared with the count of remaining subpixels for that point feature, and table look-ups may be used to determine the amount of size reduction and/or brightness reduction, so that, once the size and brightness for each calligraphic point feature and each subpixel therein is determined, the calligraphic point features can be displayed on the calligraphic display using standard techniques, preferably during a calligraphic-display interval in between raster scan intervals.

Figure 2:
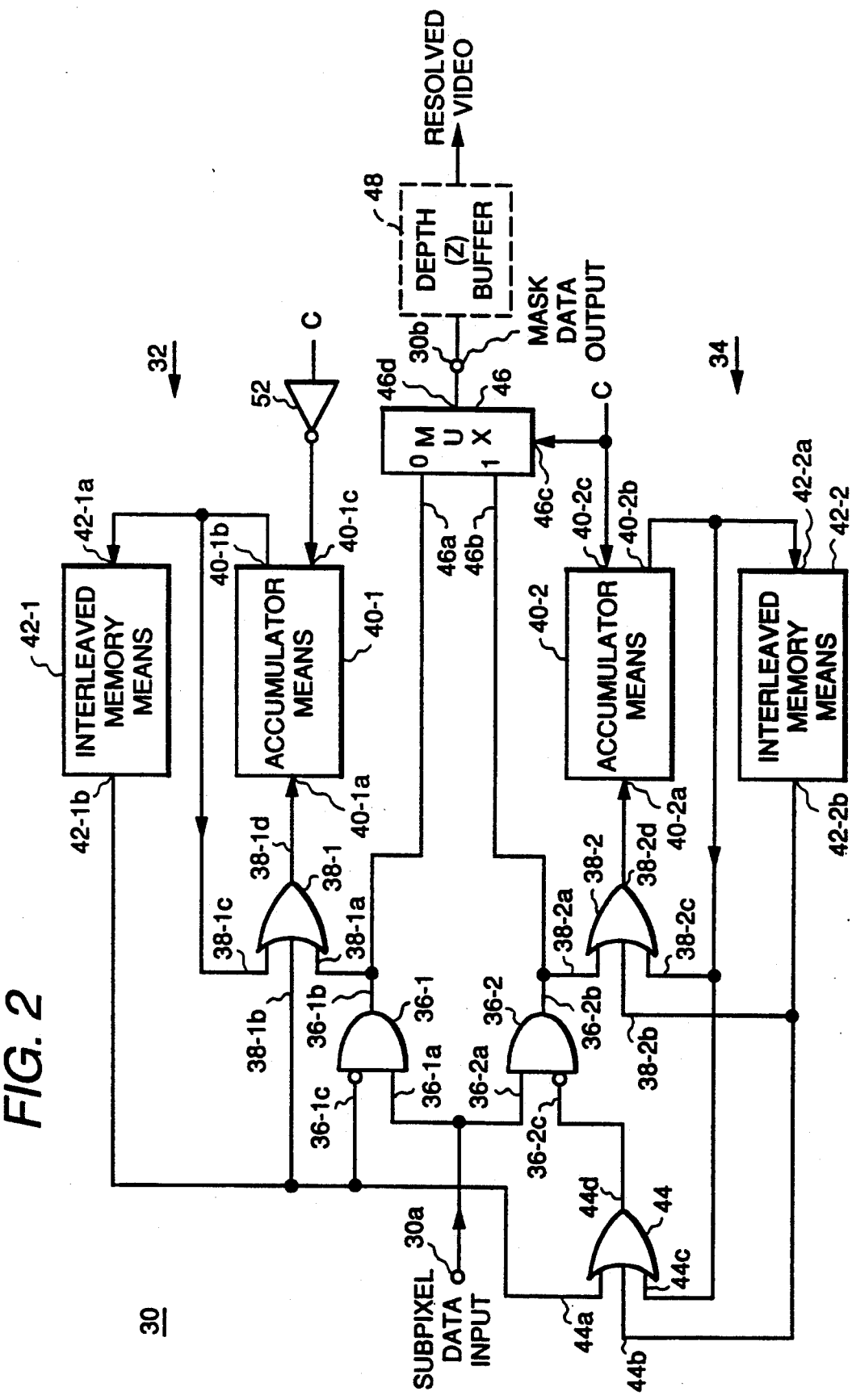
FIG. 2 is a schematic block diagram of a portion of a pixel-fill circuit providing one possible hardware configuration for carrying out at least a portion of the method of the present invention.

Referring now to FIG. 2, pixel-fill circuit 30 is shown which may be utilized after a range ordering subassembly in the display processor of a span-processing CIG system (as further shown in FIG. 5 of the aforementioned Patent). The pixel-fill circuit 30 receives mask data (i.e. subpixel cell data, including previously established depth Z values and cell attribute information, if required) at an input 30a and provides output data at an output 30b. Circuit 30 includes a raster mask data portion 32 and a calligraphic point data portion 34. Each portion has an AND gate 36, an OR gate 38, a mask accumulator 40 and an interleaved memory means 42. The calligraphic data portion 34 has an additional OR means 44, while a common multiplexer (MUX) means 46 is used to select which of portions 32 or 34 provide the output data (possibly to a depth buffer means 48 subsequently positioned to receive mask data output from output 30b).

The raster data section 32 receives, at the circuit input 30a, sequential subpixel data for the portions of each face 18 in each span making up a presently-processed-raster image. The data is broken down into range-separable groups, so that the data for all of the first (nearest) RSG in each span is sent to circuit 30 sequentially, before the data for face(s) in a second RSG in any of the spans is sent. Only after the first RSG in all spans has been processed will the sequence of second RSGS in all spans be processed, before being followed, sequentially, by the third, fourth, ... RSGs in the sequential set of spans. Thus, the accumulator means 40-1 and the interleaved memory means 42-1 are initially reset and the data for the first range separable group of the first (e.g. upper left) span of a display frame is sent through input 30a and appears at gate input 36-1a. The output 42-1b of the previously-reset memory provides a low logic level at gate input 36-1c, which is inverted and allows the data at input 36-1a to appear at gate output 36-1b and then at OR gate input 38-1a. Since there are now low logic level signals at inputs 38-1b and 38-1c, the gate output 38-1d will contain the raster mask subpixel data from input 30a. This data then appears at mask accumulator means 40-1a and is clocked into storage therein, responsive to a raster-storage clock signal (not shown) and the presence of a calligraphic-control C signal being low and providing a raster mask accumulator means high logic level at input 40-1c (by action of inverter 52). Thus, if the sightline through the presently-considered subpixel of the present span does not intersect a face point, the accumulator 40-1 receives and stores a low logic level bit for the subpixel; conversely, if the subpixel sightline (such as line 20') passes through a surface point (i.e. point 18-1a) the accumulator means 40-1 stores a high-logic level for that subpixel, as well as the distance (e.g. Z1) for that subpixel. When all of the subpixels in a particular span have been sequentially input, the subpixel information from the next span is sequentially input and operated upon, and so on through all of the spans. At the end of the operations which input the data from the first range-separable group in each of the totality of the spans in the raster, this information is stored in interleave memory means 42-1, and the first span of the raster is now reentered for inputting of the second RSG data therefrom. Simultaneous with the receipt of subpixel data (and the associated Z distance previously appended thereto) for the second RSG of the first span, the stored data from that first span is output from memory means 42-1, and appears at gate inputs 36-1c and 38-1b. If the data bit stored in memory means 42-1 for the subpixel then being processed is at the high-logic level (indicative of a closer face point in the first RSG) gate 36-1 will be inhibited, because it is immaterial as to whether that pixel in the further RSG contains a face point or not; the higher-priority first RSG face point bit at input 38-1b is passed by gate 38-1 to its output 38-1d and the input 40-1a of the accumulator means. On the other hand, if that subpixel location had, in the previous RSG(s), all been devoid of a stored high logic level therefore, indicative of the absence of a image-contributing face point along the sightline for that subpixel, gate input 36-1c now receives a low logic level and gate 36-1 is enabled; if the subpixel raster mask data at input 30a is a low logic level (no encountered face point in the second RSG), the accumulator means still stores a low logic level for that subpixel; but if the subpixel sightline does encounter a face point in the second RSG, a high logic level bit passes through gates 36-1 and 38-1 and is accumulated in means 40-1 (along with its depth Z information). The accumulator means is cleared after operating upon the data for that span, and the rest of the sequence of spans is repeated for all of the second RSG data mask inputs. Thereafter, the entire sequence is repeated for all spans and for each sequential lower (i.e. further) RSG, until all spans and RSGs have been input. At this point, memory means 42-1 contains a high logic level for each subpixel in which a point on one of the surfaces 18 is visible, as well as data from which the surface number, distance and attributes can be obtained (directly or indirectly). This raster-defining data is clocked through gate 36-1 and then through MUX means 46 (as the input 46a is connected to the output 46d, responsive to a low logic level at control input 46c); thus mask data output can be stored and/or fed to a depth (Z) buffer means 48 and the like.

Once the raster mask data has been processed, the ordered data for the set of circular point features is sent to input 30a. The calligraphic-control C signal is now at a high logic level and a similar process is repeated for all of the calligraphic point subpixels, sequentially considering each span and each RSG (at the end of each of which are the ordered set of associated point surfaces 16). Once all the RSG point-feature-ordered sets have been processed for all of the sequential spans, the data is output through MUX means 46 (with input 46b now being connected to output 46d responsive to the now high logic level C signal at input 46c) and can be similarly used or stored by means located after the mask data output 30b. It will be seen that the pixel-fill circuit portion 34 thus first accumulates data, on a subpixel-by-subpixel basis, for the nearest circular point feature in the first RSG, then considers, only for those subpixels in which a high logic level data bit has not been already accumulated responsive to the nearest point feature, each sequential one of the other range-ordered point features in the first RSG, and then considers whether any subsequent RSGs contain a calligraphic point feature subpixel for inclusion in the accumulator. For each successive RSG, each subpixel in the span is considered for inclusion of new point feature information only if that subpixel has not already accumulated a high logic level bit responsive to a nearer point feature being present along that subpixel sightline.

From the foregoing, those skilled in the art will now understand that the information output from terminal 30b first contains a full raster set of depth-prioritized raster surface mask information, and then contains a full raster of depth-prioritized calligraphic point feature information; raster point-to-raster point interferences ("collisions") are removed by operation of portion 32, while interferences between a nearer calligraphic point feature and other calligraphic point features in collision/conflict therewith are removed by operation of portion 34.

It now only remains to remove any conflicts between the separate sets of now-prioritized raster faces and now-prioritized calligraphic point features. This final conflict set is resolved by operation of subsequent depth buffer means 48, in which the depth Z distance of each subpixel of the first-output face points (e.g. face point 18-1b, for sightline 20") and subsequently-output calligraphic surface points (e.g. point surface 16d) is compared and only the data for the closest subpixel sent to the display means. In the foregoing example, for sightline 20", the depth buffer is first set to depth Z2, for point 18-1b, which depth is then compared to the subsequently-received depth Zd for surface 16d; the point surface Zd being less than the point depth Z2, subpixel 12s" is assigned the attributes of point feature 16d (including the depth Zd thereof). In this manner, the raster face-calligraphical point feature conflict at any subpixel of the image plane 12 is resolved and the proper priority assigned to the nearest one of the point feature or face surface thereat.

While one presently preferred embodiment of our novel method for resolving priority between a calligraphically-displayed point feature and both raster-displayed and other calligraphically-displayed point features in a GIG system has been described in some detail herein, many modifications and variations will now become apparent to those skilled in this art. It is our intent, therefor, to be limited only by the scope of the appending claims and not by the specific details and instrumentalities presented herein by way of discussion of our presently preferred embodiment.

What we claim is:

1. A method for determining a proper occultation relationship between a calligraphic point feature of a display image and at least one of another calligraphic point feature and a potentially-raster-visible surface face in the same cell of a display image comprised of an ordered set of display cells, comprising the steps of:
   (a) resolving the occultation relationships between all calligraphic point features of a calligraphic portion of the display image, to obtain a depth-ordered set of calligraphic point features;
   (b) resolving the occultation relationships between all potentially-raster-visible surface faces of a raster portion of the display image, to obtain a depth-ordered set of potentially-raster-visible surface faces; and
   (c) then resolving for each cell of the display image the occultation relationships between each of the depth-ordered calligraphic point features and each of the depth-ordered potentially-raster-visible faces located along a sightline passing through that cell.

2. The method of claim 1, wherein step (b) is carried out by means of a depth buffering operation.

3. The method of claim 2, wherein the depth-buffering operation comprises the steps of: assigning each surface cell a depth value along a preselected direction with respect to an image plane; and comparing the depth value of each surface cell to a minimum depth value, with respect to a viewpoint location, for all previously compared depth values.

4. The method of claim 1, further comprising the step of dividing the total image screen into an array of spans, each containing an ordered set of cells; and step (a) includes the step of accumulating for each span an indication of the presence of a point feature contribution in a successively-considered one of the cell set for that span, for point features of successively greater depths.

5. The method of claim 4, wherein step (a) further includes the step of sequentially operating upon each span of the display image.

6. The method of claim 4, wherein step (a) further includes the steps of: separating the calligraphic point features by range-separable group (RSG); resolving priority conflicts, for each cell, among the point features of each RSG; and then resolving priority conflicts between the resolved point features for all RSGs.

7. The method of claim 6, wherein priority conflicts in the point features of all spans of a display image frame are resolved for each RSG level prior to resolution of all spans in a next-subsequent RSG level.

8. The method of claim 4, wherein step (b) further comprises the step of accumulating for each span an indication of the presence of a raster face contribution in a successively-considered one of the cell set for that span, for raster faces of successively greater depths.

9. The method of claim 8, wherein step (b) further includes the step of sequentially operating upon each span of the display image.

10. The method of claim 9, wherein step (b) further includes the steps of: separating the raster faces by range-separable group (RSG); resolving priority conflicts, for each cell, among the raster faces of each RSG; and then resolving priority conflicts between the resolved raster faces of all RSGs.

11. The method of claim 10, wherein step (b) is carried out by means of a depth buffering operation.

12. The method of claim 11, wherein the depth-buffering operation comprises the steps of: assigning each surface cell a depth value along a preselected direction with respect to an image plane; and comparing the depth value of each surface cell to a minimum depth value, with respect to a viewpoint location, for all previously compared depth values.

13. The method of claim 1, wherein all of the raster face contributions to one cell are separately processed before all of the calligraphic point feature contributions to that same cell are processed.

14. The method of claim 1, wherein processing of raster face and calligraphic point feature contributions to each cell are interleaved.

15. A method for determining a proper occultation relationship between a calligraphic point feature and at least one of another calligraphic point feature and a potentially-raster-visible surface face in a raster portion of a display image frame, comprising the steps of: dividing the total image screen into an array of cells; determining which of the cells on the total screen lie inside each of the potentially-raster-visible faces and calligraphic point features which must be considered for the total image screen; ordering the distance of each of the potentially-raster-visible faces from a viewing point; ordering the distance of each of the calligraphic point features from the viewing point; and comparing the ordered distances of each calligraphic point feature to at least one of the potentially-raster-visible face distances and other calligraphic point features distances to determine which of the cells lying inside of each of the calligraphic point feature, the raster face or the other calligraphic point feature are occluded and which cells are visible.

16. The method of claim 15, wherein each cell is one of a plurality of subpixels forming a pixel of the display image frame, and including the steps of: determining subpixel priority for each of a sequence of range-sequential raster cells; storing range information therefor; separately determining priority for each of a sequence of point-feature subpixels following in the same range-separated group; and resolving raster-raster and feature-feature cell priorities in each subpixel; and then resolving raster-point feature subpixel priorities.

17. The method of claim 16, wherein the raster-point feature priorities are resolved by a depth buffer operation.

* * * * *

UNITED STATES PATENT AND TRADEMARK OFFICE
CERTIFICATE OF CORRECTION

PATENT NO. : 5,293,467
DATED : March 8, 1994
INVENTOR(S) : G. Buchner et al

It is certified that error appears in the above-indentified patent and that said Letters Patent is hereby corrected as shown below:

On the title page, insert "Attorney, Agent or Firm" - Geoffrey H. Krauss.

Signed and Sealed this

Twelfth Day of July, 1994

Attest:

BRUCE LEHMAN

*Attesting Officer*     *Commissioner of Patents and Trademarks*